Patented Nov. 13, 1951

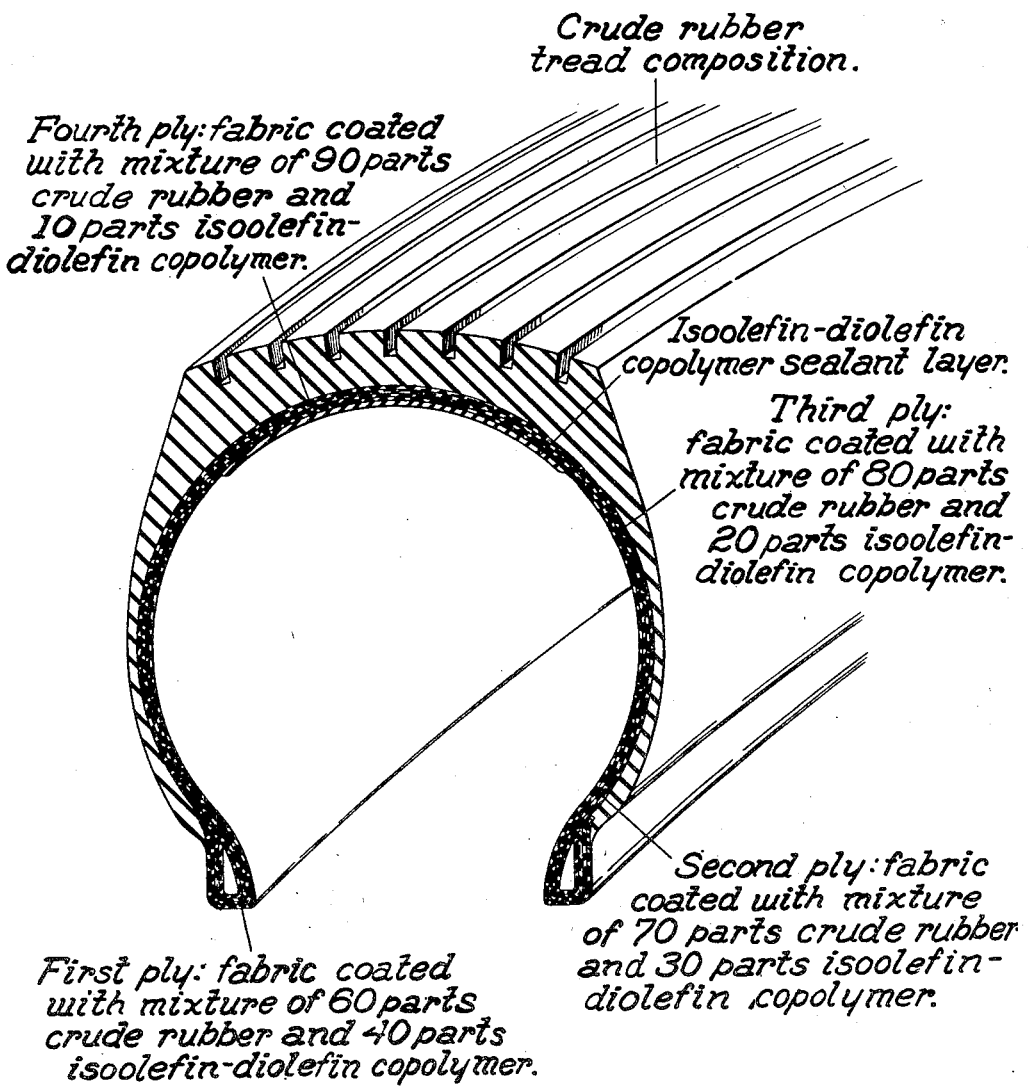

2,575,249

UNITED STATES PATENT OFFICE 2,575,249

PNEUMATIC RUBBERY ARTICLE AND METHOD OF MAKING SAME

Balfour Y. Connell, Cuyahoga Falls, Ohio, and Ward E. Fisher, Seymour, Conn., assignors to The B. F. Goodrich Company, New York, N. Y., a corporation of New York Application November 20, 1948, Serial No. 61,298

5 Claims. (Cl. 154—139)

This invention relates to a pneumatic rubbery article which is resistant to the diffusion of air therethrough and the method of making same. More particularly, the invention is concerned with a pneumatic article such as a tubeless tire or the like made from a rubbery composition resistant to air diffusion and the preferred method of making same.

Pneumatic articles, for many years, were prepared from crude rubber compositions which were strong, elastic, flexible and resistant to puncture. Crude rubber, however, was not completely satisfactory from the standpoint of its resistance to the diffusion of air therethrough, and it was necessary periodically to reinflate the article. This led to the use of the rubbery isoolefin-diolefin copolymers, which exhibit excellent air-diffusion resistance, as a barrier lining in the conventional rubbery articles or to replace the other rubbery constituents altogether. The use of such isoolefin-diolefin copolymers eliminated the problem of air diffusion but in turn raised other problems. When used as the sole rubbery constituent in a rubbery article, the copolymers were somewhat deficient in tear resistance, tensile strength and the other physical properties exhibited by crude rubber. When used only as a barrier layer, the copolymers proved to be very poorly adherent to other rubber or to textile cord and the article was subject to ply separation in use.

It is, therefore, an object of this invention to provide a vulcanizable rubbery composition suitable for making pneumatic articles of excellent physical properties, including air-diffusion resistance, and to provide a construction whereby a composite article can be prepared from a plurality of plies which can be vulcanized together to form a unitary article not readily subject to ply separation.

We have discovered that a suitable rubbery composition containing a total of 100 parts by weight of rubbery material is prepared by mixing together 60 to 90 parts by weight of unvulcanized vulcanizable crude rubber and 10 to 40 parts by weight of an unvulcanized vulcanizable rubbery copolymer of a major proportion of an isoolefin having from 4 to 7 carbon atoms with a minor proportion of an open-chain conjugated diolefin having from 4 to 8 carbon atoms; that this composition can be formed into the desired rubbery article and vulcanized to yield an article having excellent resistance to diffusion of air therethrough as well as the other desired physical properties; and that when a plurality of plies of a rubbery composition, having the rubbery constituents in the range of proportions set forth hereinabove, are plied together in the unvulcanized condition in face-to-face abutting relation and vulcanized, the plies are strongly adhered together. Furthermore, it has been found that the compositions described above may be strongly adhered to crude rubber or to other synthetic rubber compositions by merely vulcanizing the compositions while pressed together.

We have found that the unvulcanized rubbery isoolefin-diolefin copolymers can be blended with unvulcanized crude rubber in an amount up to two-thirds of the weight of the crude rubber and the resulting mixture can be vulcanized without reducing the properties of the crude rubber below the usable range. Further, we have found that it is not necessary to employ a barrier layer consisting solely of the rubbery isoolefin-diolefin copolymer to obtain resistance to air diffusion but that when the copolymer is mixed in crude rubber, the air diffusion of the rubbery composition is increased in direct proportion to the amount of the copolymer incorporated therein.

The rubbery composition comprising crude rubber and a rubbery isoolefin-diolefin copolymer adheres well to a body of the same or similar composition when placed in contact therewith and vulcanized in abutting relation and also adheres to any of the other common polymeric organic rubber materials, whether crude or synthetic, when vulcanized in contact with plies of such other rubber materials.

In preparing an air-diffusion resistant rubbery composition embodying this invention, any sulfur-vulcanizable naturally occurring crude rubber may be used such as caoutchouc and the like. The rubbery copolymer which is mixed with the crude rubber may be any of those rubbery plastic hydrocarbon copolymers commonly known as "Butyl" rubber prepared by the low temperature copolymerization of a major proportion of an isoolefin and a minor proportion of an open-chain conjugated diolefin according to the usual method of copolymerizing such monomers as disclosed in detail in U. S. Patents 2,356,128; 2,356,129; and 2,356,130 to Thomas and Sparks. The copolymers are commonly prepared by copolymerizing a major proportion of an isoolefin having from 4 to 7 carbon atoms with a minor proportion of an open-chain conjugated diolefin having from 4 to 8 carbon atoms, and the copolymer is desirably the copolymer of a major proportion of isobutylene with a minor proportion of isoprene. Preferably, the copolymer comprises from 70 or 80 to 99½ parts by weight of an isomonoolefin such as isobutylene or ethyl methyl ethylene copolymerized with from one-half to 20 or 30 parts by weight of an open-chain conjugated aliphatic diolefin such as isoprene; butadiene-1,3; piperylene; 2 3-dimethyl butadiene-1,3; 1,2-dimethyl butadiene-1,3; 1,3-dimethyl butadiene-1,3; 1-ethyl butadiene-1,3; 1,4-dimethyl butadiene-1,3 and the like; the total weight of said monomers in the polymerization mixture being 100 parts by weight.

The rubbery copolymer in the air-diffusion resistant composition may equal the weight of the crude rubber but preferably amounts to from one-ninth to two-thirds the weight of the crude rubber, or 60 to 90 parts by weight of crude rubber and 10 to 40 parts by weight of the rubbery copolymer in a total of 100 parts of rubbery material. The preferred range of proportions for obtaining optimum adhesion and air-diffusion resistance is from 70 to 80 parts by weight of crude rubber and from 20 to 30 parts by weight of the rubbery copolymer in a total of 100 parts of rubbery material.

The composition may include, in addition to the rubbery constituents, any of the commonly employed compounding ingredients for rubber material including vulcanizing agents and accelerators therefor, antioxidants, reinforcing agents, fillers, softeners, etc., in amounts and proportions in accordance with conventional compounding techniques. The composition may be mixed by any of the well-known methods of rubber processing such as by mixing on a mill or in an internal mixer such as a Banbury or Schiller mixer.

An article embodying this invention may comprise a single layer of the rubbery composition prepared in accordance with the invention, or a plurality of layers or plies of the same composition disposed in face-to-face abutting relation while in the unvulcanized condition and thereafter vulcanized while in abutting relation to adhere the plies together and form a unitary article.

Alternatively, one or more plies of any conventional rubbery composition comprising a vulcanizable polymeric organic rubber material may be assembled with the crude rubber-isoolefindiolefin copolymer plies and vulcanized in contact therewith. Thus, the conventional rubbery composition which may be adhered to the air-diffusion resistant composition may comprise as the rubbery constituent thereof any of the well-known vulcanizable rubber materials, whether crude or synthetic, and among the sulfur-vulcanizable rubbers which may be used are naturally-occurring crude rubber such as caoutchouc and the like or synthetic rubbers such as the rubbery polymers of the open-chain conjugated aliphatic diolefins having from 4 to 8 carbon atoms including the butadiene-1,3 hydrocarbons such as butadiene-1,3, isoprene, piperylene, 2,3-dimethyl butadiene-1,3 and the like as well as the copolymers of these or similar monomeric materials with each other or with such copolymerizable monomeric materials as isobutylene, styrene, acrylonitrile, methacrylonitrile, methyl acrylate, methyl methacrylate, ethyl acrylate, ethyl methacrylate, 2-vinyl pyridine and the like, as well as mixtures of these or similar materials with each other or with reclaimed crude or synthetic rubber.

Preferably, a pneumatic article is assembled from a plurality of plies of a rubbery composition wherein each succeeding ply outwardly from the inner ply has not more than and preferably less rubbery isoolefin-diolefin copolymer present than the next preceding ply. Thus, the inner ply will exhibit the greatest resistance to air diffusion, but any air which does diffuse through the inner ply will not be trapped between succeeding plies since the diffusion through the succeeding plies will be at a rate at least as fast as the rate of diffusion through the inner plies. In this manner, the possibility of blisters of entrapped air between the plies is obviated. The percentage of rubbery copolymer in the total rubbery constituents in any given ply may vary widely from the percentage of such copolymer in the next preceding ply but the percentage preferably is from one-half to equal the percentage of copolymer in the next preceding ply and desirably amounts to at least two-thirds and more desirably at least-three-quarters of the amount of such copolymer in the next preceding ply.

In making a preferred composite structure, any desired combination of ply compositions may be used, provided that at least one of the plies comprises a rubbery composition having as the sole rubbery constituent thereof 100 parts by weight of a mixture of rubber materials consisting of from 60 to 90 parts by weight of crude rubber and 10 to 40 parts by weight of rubbery isoolefin-diolefin copolymer. Thus, for example, the following 4-ply articles are typical of the articles made with crude rubber and rubbery isoolefin-diolefin copolymers as the sole rubbery constituents; the figures given representing the ratio of the crude rubber to the rubbery isoolefin-diolefin copolymer in each ply with the first ply being the inner ply:

|  | 1st Ply | 2nd Ply | 3rd Ply | 4th Ply |
| --- | --- | --- | --- | --- |
| Article 1 | 60:40 | 70:30 | 80:20 | 80:20 |
| Article 2 | 60:40 | 70:30 | 100:0 | 100:0 |
| Article 3 | 75:25 | 75:25 | 75:25 | 75:25 |

It will be understood that these examples are merely illustrative and that the ratio of the crude rubber to the rubbery isoolefin-diolefin copolymer may be varied within the limits set forth hereinabove and that plies comprising compositions of other rubber materials may be employed in combination therewith. The construction of a tubeless tire which is a preferred embodiment of the invention will be detailed to illustrate the invention.

*Example*

The following basic recipe is employed with the crude rubber and rubbery isoolefin-diolefin copolymer varied as set forth hereinafter.

| Material | Parts by Weight |
| --- | --- |
| Crude Rubber: Isobutylene-Isoprene Rubber (80:20 Copolymer) | 100.00 |
| Zinc Oxide | 5.00 |
| Carbon Black | 25.00 |
| Cottonseed Fatty Acid | 1.50 |
| Pine Tar | 2.00 |
| Isopropoxy Diphenylamine | 0.75 |
| Sulfur | 3.00 |
| Alkyl Thiazyl Disulfide | 0.70 |
| Total | 137.95 |

Four separate batches of this base recipe are mixed having the ratio of crude rubber to isobutylene-isoprene copolymer as follows, namely, 60:40; 70:30; 80:20; and 90:10 parts by weight, respectively. The compounds are mixed on a mill in accordance with conventional rubber processing techniques. The respective batches are then calendered on weak-wefted or weftless tire cord, as for example, nylon tire cord (210–4–2), so that the cord is coated on both sides with a continuous layer of the rubbery composition to form tire carcass plies.

The respective plies are thereafter assembled in face-to-face abutting relation to form a tubeless tire carcass with the inner ply comprising the rubbery composition containing 40 parts by weight of the isobutylene-isoprene copolymer and with each succeeding ply outwardly from the inner ply containing less copolymer than the next preceding ply.

A tread layer of conventional crude rubber composition is disposed on the assembled carcass, and the entire assembly is vulcanized in a mold at 295° F. for 45 minutes. The resulting tubeless tire as shown in the appended drawing has the component plies thereof strongly adhered together and possesses excellent resistance to diffusion of air therethrough. The tire is not subject to inter-ply blistering due to entrapment of diffusing air, and is not subject to rapid failure if the tire is run while flat as is the case where a single lining layer of isoprene-isobutylene copolymer alone is used. The vulcanization of the crude rubber-copolymer mixture is sufficient to impart optimum physical properties such as tensile strength, resistance to flex cracking, etc. The construction may be varied to make the tire self-sealing by disposing a sealing layer comprising the rubbery copolymer as the sole rubbery constituent inside the inner ply before vulcanization.

Similar results are obtained with any composite article adapted to retain air using any of the rubbery compositions embodying this invention either alone or in combination with other rubbery bodies; and it will be understood that the invention is not limited to the specific embodiment thereof detailed hereinabove but that variations and modifications may be effected within the spirit and scope of the invention as defined in the appended claims.

We claim:

1. The method of making a pneumatic article resistant to air diffusion, which method comprises forming a plurality of plies of vulcanizable composition comprising 100 parts by weight of a mixture of rubber materials consisting of 60 to 90 parts by weight of unvulcanized vulcanizable crude rubber and 10 to 40 parts by weight of an unvulcanized vulcanizable rubbery copolymer of from 80 to 99½ parts by weight of an isoolefin having from 4 to 7 carbon atoms with from one-half to 20 parts by weight of an open-chain conjugated diolefin having from 4 to 8 carbon atoms, and a vulcanizing agent for said rubber materials, each successive ply having a higher percentage of crude rubber therein than the preceding ply, assembling said plies in face-to-face abutting relation with each succeeding ply outwardly from the inner ply having a higher percentage of crude rubber therein than the preceding ply, and thereafter vulcanizing the assembly.

2. The method of making a tubeless tire resistant to air diffusion, which method comprises forming a plurality of plies of vulcanizable rubbery composition reinforced with textile cord incorporated therein, said rubbery composition comprising unvulcanized sulfur-vulcanizable rubber material, at least one of said plies comprising a vulcanizable composition including as the sole rubbery constituent thereof 100 parts by weight of a mixture of rubber materials consisting of 60 to 90 parts by weight of unvulcanized vulcanizable crude rubber and 10 to 40 parts by weight of unvulcanized vulcanizable rubbery copolymer of from 80 to 99½ parts by weight of isobutylene with from one-half to 20 parts by weight of isoprene, assembling the plies so that each succeeding ply inwardly from the outer ply contains a percentage of the rubbery copolymer therein at least as large as the percentage of said copolymer in the next preceding ply, and thereafter vulcanizing the assembly.

3. A pneumatic article resistant to diffusion of air therethrough, said article comprising a plurality of plies of rubbery composition assembled in the unvulcanized state in face-to-face abutting relation and vulcanized together, said rubbery composition of each ply comprising 100 parts by weight of a mixture of rubber materials consisting of 60 to 90 parts by weight of crude rubber and 10 to 40 parts by weight of a rubbery copolymer of from 80 to 99½ parts by weight of an isoolefin having from 4 to 7 carbon atoms and from one-half to 20 parts by weight of an open-chain conjugated diolefin having from 4 to 8 carbon atoms, each succeeding ply outwardly from the inner ply having a larger percentage of crude rubber therein than the next preceding ply.

4. A tubeless tire having a carcass comprising a plurality of plies of rubbery composition reinforced with textile cord, said plies being disposed in face-to-face abutting relation and vulcanized together in a unitary assembly, the rubbery composition of each said ply comprising a sulfur vulcanized rubber, at least one of said plies comprising a rubbery composition having as the sole rubbery constituent thereof 100 parts by weight of a mixture of rubber materials consisting of 60 to 90 parts by weight of crude rubber and 10 to 40 parts by weight of a rubbery copolymer of from 80 to 99½ parts by weight of isobutylene with from one-half to 20 parts by weight of isoprene, each succeeding ply inwardly from the outer ply including in the rubbery constituent thereof an amount of said rubbery copolymer larger than the amount of said rubbery copolymer in the next preceding ply.

5. A hollow article adapted to contain air under pressure, said article having a laminated wall including a plurality of layers comprising vulcanized rubbery composition bonded together in adherent relationship, said rubbery composition comprising 100 parts by weight of a mixture consisting of 60 to 90 parts by weight of crude rubber and 10 to 40 parts by weight of a rubbery copolymer of from 80 to 99½ parts by weight of an isoolefin having from 4 to 7 carbon atoms and from one-half to 20 parts by weight of an open-chain conjugated diolefin having from 4 to 8 carbon atoms, each succeeding layer outwardly from the inner layer having a larger percentage of crude rubber therein than the next preceding layer.

BALFOUR Y. CONNELL.
WARD E. FISHER.

(References on following page)

REFERENCES CITED

The following references are of record in the file of this patent:

UNITED STATES PATENTS

| Number | Name | Date |
|---|---|---|
| 1,862,492 | Mallory | June 7, 1932 |
| 2,278,802 | Sarbach | Apr. 7, 1942 |
| 2,332,194 | Beekley et al. | Oct. 19, 1943 |
| 2,378,717 | Macey | June 19, 1945 |
| 2,395,071 | Sarbach | Feb. 19, 1946 |
| 2,405,943 | Doering et al. | Aug. 20, 1946 |
| 2,467,322 | Lightbown et al. | Apr. 12, 1949 |
| 2,469,710 | Baldwin | May 10, 1949 |
| 2,471,905 | Smith | May 31, 1949 |
| 2,482,600 | Sarbach | Sept. 20, 1949 |

OTHER REFERENCES

Lightbown, pp. 377–380, Rubber Age, Aug. 1942.